United States Patent
McNamara et al.

(10) Patent No.: US 6,329,977 B1
(45) Date of Patent: Dec. 11, 2001

(54) PRE-FILTERED ANTIALIASED LINES USING DISTANCE FUNCTIONS

(75) Inventors: Robert S. McNamara, Portola Valley, CA (US); Joel J. McCormack, Boulder, CO (US); Norman P. Jouppi, Palo Alto, CA (US); James T. Claffey; James M. Knittel, both of Groton, MA (US); Larry D. Seiler, Boylston, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/037,412

(22) Filed: Mar. 10, 1998

(51) Int. Cl.[7] .............................. G09G 5/10; G06T 11/20; G06T 11/40
(52) U.S. Cl. .......................... 345/147; 345/443; 345/432
(58) Field of Search .................................... 345/441, 443, 345/147, 505, 509, 419, 436, 425, 514

(56) References Cited

U.S. PATENT DOCUMENTS

| | | | |
|---|---|---|---|
| 4,808,984 | * 2/1989 | Trueblood et al. | 345/509 |
| 4,873,515 | * 10/1989 | Dickson et al. | 340/728 |
| 5,206,628 | * 4/1993 | Kelleher | 345/505 |
| 5,243,695 | * 9/1993 | Russell et al. | 345/443 |
| 5,253,335 | * 10/1993 | Yoshiyuki et al. | 345/422 |
| 5,559,529 | * 9/1996 | Maher | 345/147 |

OTHER PUBLICATIONS

Feibush et al., "Synthetic Texturing Using Digital Filters", Cornell University, 1980.*
Pineda, Juan, "A Parallel Algorithm for Polygon Rasterization," Apollo Computer Inc., 1988, ACM #0–89791–275–6/88/008/0017.
Gupta et al., "Filtering Edges for Gray–Scale Displays," Carnegie–Mellon University, 1981, ACM #0–8971–045–1/81–0800–0001.

* cited by examiner

Primary Examiner—Matthew Luu
Assistant Examiner—Chante' Harrison
(74) Attorney, Agent, or Firm—Leah Sherry; Oppenheimer, Wolff & Donnelly; Loren H. McRoss

(57) ABSTRACT

A computer graphics system renders an image on a display device using improved pre-filtering techniques that minimize aliasing artifacts in the image, particularly at the endpoints of lines. To anti-alias the image, a plurality of edges are placed near a line in the image. An edge function represents the edge. This edge function is multiplied by a scale factor to produce a distance function. This scale factor is the reciprocal of the Euclidean length of the line. The distance function is evaluated to determine the distance of selected pixels from each edge in units of pixels. These distances determine the intensity value for each selected pixel. Pixels on or beyond an edge, with respect to the line, are given a minimum intensity value; pixels inside all edges are given intensity values corresponding to their distances from the edge. An intensity function describing a relationship between pixel distances from the edges and their corresponding intensity values is developed. The intensity function can be implemented in a look-up table or approximated with hardware.

40 Claims, 12 Drawing Sheets

PRE-FILTERED ANTIALIASED LINES USING DISTANCE FUNCTIONS

FIELD OF THE INVENTION

This invention relates generally to computer graphics, and more particularly to a method and apparatus for reducing aliasing artifacts in images defined by pixels.

BACKGROUND

Pixel-based graphics systems define images on a display device by a two-dimensional, rectangular array of pixels. The discrete nature and finite number of such pixels can lead to visual artifacts such as jagged or staircase edges. These aliasing effects worsen for animated images where the jagged edges turn into crawling artifacts. Aliasing artifacts can occur when an entire pixel is given an intensity or color based upon an insufficient sample of points within that pixel, such as, for example, when a pixel is given either full intensity or no intensity, depending upon whether the image covers the center of the pixel.

To lessen or eliminate such jagged or crawling artifacts, the intensity of a pixel should not depend entirely upon whether the image covers a single point in the pixel. Accordingly, a variety of antialiasing techniques base the intensity of a pixel on more than that pixel's center. One such technique uses filters. Filters determine the intensity of each pixel by averaging data from a small area around that pixel. The width of the filter determines the area around the pixel that is included within the averaging, and a filter function is a weighting function applied to the averaging. For example, a box filter gives equal weight to the entire area covered by the filter. More sophisticated filter functions, such as a conical function, for example, give more weight to the area near the center of a pixel than to the area farther away. In practice, such sophisticated filters have better high-frequency rejection than box filters and consequently produce better antialiased images.

A problem, however, is that determining the pixel area covered by a sophisticated filter function and performing the weighted averaging can be computationally expensive. This is especially true if this filtering must be performed using multiple sample points within or near a pixel each time the pixel is written. One pre-filtering technique, described by Satish Gupta and Robert F. Sproull in "Filtering Edges for Gray-Scale Displays", *Proceedings of SIGGRAPH* 81, pp. 1–5, 1981, attempts to mitigate the problem by using a table to store pre-computed intensity values. The technique uses the table to map distances of pixels from the center of the line to be antialiased into pixel intensities.

Properly antialiasing the endpoints of a line, however, has traditionally been a problem for such pre-filtering techniques. In order to determine intensities for pixels at the endpoints, the technique described by Gupta et al., for example, must compute the slope of the line to produce an index into a table that maps slopes into pixel intensities. As a result, special operations are required at the start and end of each line. Moreover, the table works only for lines with endpoints that have integer coordinates, and the size of the table would become impracticable for line endpoints that are specified with multiple bits of sub-pixel precision. Thus, some filtering implementations simply ignore the endpoints—but then the endpoints become sharply cut off and remain aliased.

As a result, there remains a need for a method and computer system that can effectively antialias lines, including the endpoints, without being computationally expensive.

SUMMARY OF THE INVENTION

In accordance with the present invention, one objective is to minimize aliasing artifacts in images using improved pre-filtering techniques. More specifically, an objective is to provide pre-filtering techniques that can effectively minimize aliasing artifacts for lines, including their endpoints, by using distance functions to produce intensity values for pixels near the lines and at their endpoints. Other objectives are for these distance functions to be independent of the slopes of the lines to be antialiased and to be useful for a range of line width to filter radius ratios. Yet another objective is to map the distance values produced by distance functions into intensity value approximations that demonstrate high-frequency filtering.

The present invention relates to a method and a computer system for reducing aliasing artifacts when rendering an image on a pixel-based display device. In terms of the method, a plurality of edges are placed near the image, a pixel in the image is selected, and the distance of the pixel from each edge is determined. Based on these distances, an intensity value is determined for the pixel.

In one aspect of the method, each edge is represented by a distance function. An edge function is multiplied by a scale factor to produce a distance function. The scale factor is the reciprocal of the Euclidean length of the line times a factor that is dependent upon the width of the line and the filter radius. The distance function is evaluated to determine the distance of the pixel from each edge. Pixels on or beyond the edges are given a minimum intensity value; pixels inside all the edges are given intensity values corresponding to their distances from the edges. In another aspect of the method, an intensity function is developed to characterize a relationship between pixel distances from the edges and their corresponding intensity values. The intensity function can be implemented in a look-up table or approximated with hardware.

In terms of the computer system, an embodiment of the invention includes means for placing edges near the image. The edges together define boundaries that surround the image. The embodiment has means for selecting a pixel in the image, means for determining, for each edge, a distance value representing a distance of the pixel from that edge, and means for determining an intensity value for the pixel based upon the determined distance values. The determined intensity value improves the perceived quality of the image by reducing aliasing artifacts when the pixel is intensified according to that intensity value.

In one aspect of the computer system, the embodiment includes means for determining an overall distance value from the distance values, and means for determining the intensity value from the overall distance value. In another aspect, the system includes means for determining an intensity value for each distance value, and means for combining the intensity values for each distance value to produce the intensity value for the pixel.

In still another aspect of the embodiment, the image is a line. Two of the edges surrounding the image are perpendicular to the line and two of the edges are parallel to the line. The system includes means for determining a minimum of the distance values for the perpendicular edges, means for determining a minimum of the distance values for the parallel edges, means for determining an intensity value for each minimum distance value, and means for multiplying the intensity values determined for the minimum distance values to compute the intensity value for the pixel.

BRIEF DESCRIPTION OF THE DRAWINGS

An embodiment of the invention will be described with reference to the accompanying drawings, in which.

DETAILED DESCRIPTION OF A PREFERRED EMBODIMENT

System Overview

Figure 1:
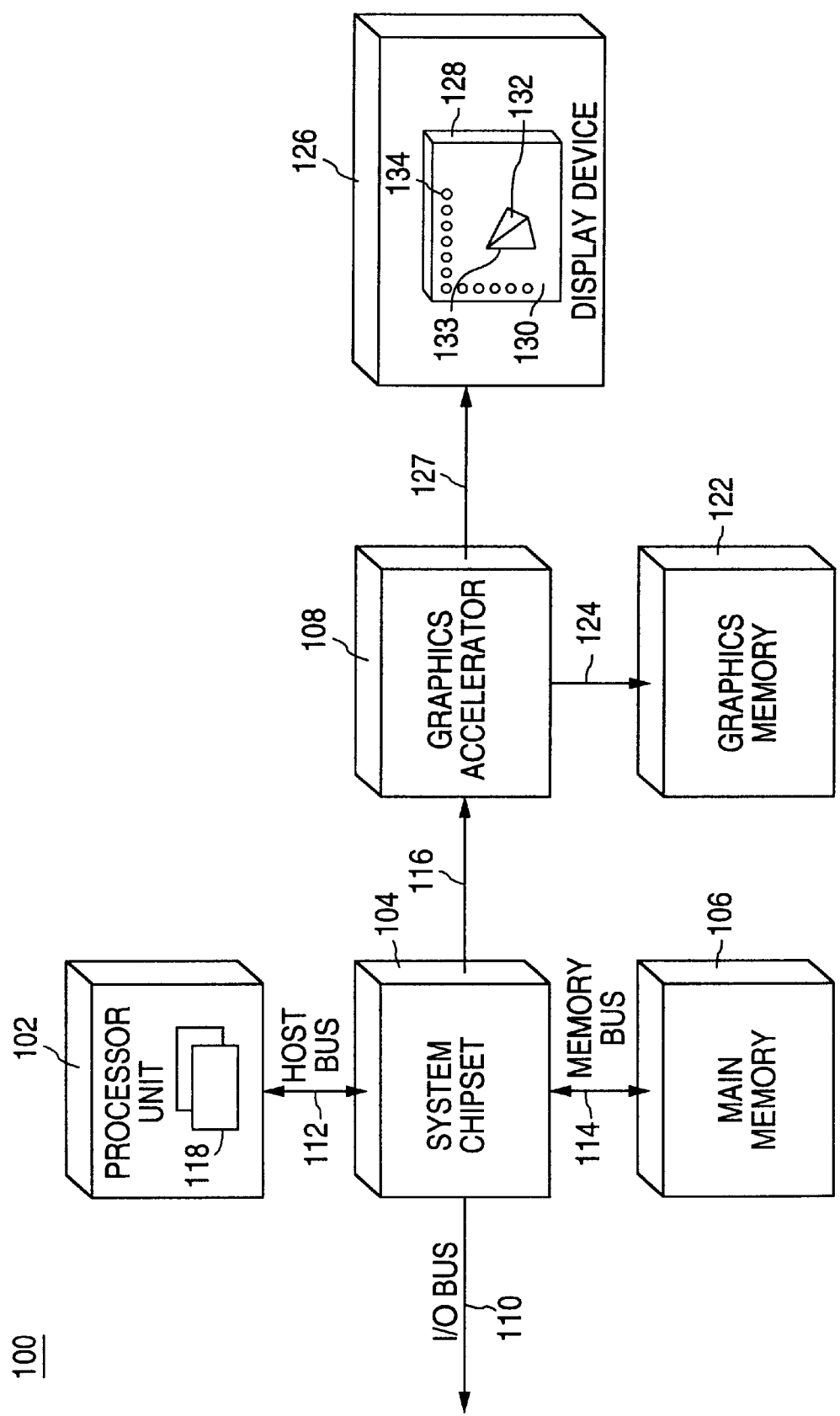
FIG. 1 is a block diagram of an exemplary embodiment of a computer graphics system of the invention.

FIG. 1 shows a computer system 100 that can generate monochrome or multicolor 2-dimensional (2D) and 3-dimensional (3D) graphic images for display, which are antialiased according to the principles of the present invention. In the computer system 100, a system chipset 104 provides an interface among a processing unit 102, a main memory 106, a graphics accelerator 108, and devices (not shown) on an I/O bus 110. The processing unit 102 is coupled to the system chipset 104 by the host bus 112 and includes a central processing unit (CPU) 118. The main memory 106 interfaces to the system chipset 104 by bus 114.

The graphics accelerator 108 is coupled to the system chipset 104 by a bus 116, by which the graphics accelerator 108 can receive graphics commands to render graphical images, and further coupled to a graphics memory 122 by a bus 124 and to a display device 126 by a bus 127. The display device 126 includes a raster display monitor 128 for producing color images on a display surface or screen 130. The invention can also be practiced with a monochrome monitor that displays gray-scale images, with a printer that prints black and white or color images, or with any other pixel-based display such as a liquid-crystal or dot matrix displays.

The display screen 130 produces an image 132 by illuminating a particular pattern of pixels 134. The image 132, for example, can be 2D alphanumeric characters or a 3D scene filled with objects. The graphics memory 122 includes storage elements for storing an encoded version of the graphical image 132. There is a direct correspondence between the storage elements and each pixel 134 on the display screen 130. The storage elements are allocated to store data representing each pixel 134. The values stored in the storage elements for a particular pixel, referred to as pixel data, control the intensity of the particular pixel 134 on the screen 130.

During operation, the computer system 100 can issue graphics commands that request an object to be displayed. The graphics accelerator 108 executes the graphics commands, converting the object into primitives and then into fragments. A primitive is a graphical structure, such as a line, a triangle, a circle, or a surface patch of a solid shape, which can be used to build more complex structures. A fragment is a 2D polygon created by clipping a primitive of the image 132, such as a line, triangle, or circle, to the boundaries of a pixel. The graphics accelerator 108 renders the fragments, and loads the pixel data corresponding to the fragments into the appropriate storage elements of the graphics memory 122. To display the image 132, the CRT monitor 128 renders the pixel data in the graphics memory 122 as illuminated points of color on the display screen 130. The displayed image 132 has smooth lines because the graphics accelerator 108 avoids aliasing artifacts by practicing the principles of the invention.

To avoid aliasing artifacts, a filter of a predetermined volume is conceptually placed over the center of each pixel that is in or near a line 133 in the image 132. The intersection of the filter with the line 133 in image 132 produces an intersection volume for that pixel. Determining the intersection volume involves computing the definite integral of that intersection. The computed area of the intersection volume determines the intensity for that pixel. For example, a large intersection volume for a pixel indicates that the pixel will contribute significantly to the line 133, and so the pixel is given a high intensity. Conversely, a small intersection volume indicates that the pixel will make little or no contribution to the line 133, and so the pixel is given a low pixel intensity. As a result, pixels that are closer to the line 133 receive higher intensities than pixels that are farther away.

In the present invention, pixel intensities are not determined by computing a definite integral for each pixel because this could require significant computation. Instead, as described below in connection with FIGS. 6 and 9, edges are placed around the line to be antialiased, and the distance of each pixel is determined from those edges. These distances are then mapped to intensity values. This mapping produces an intensity value for each pixel just as though intersection volumes had, in fact, been computed for those pixels. Thus, the present invention can pre-filter lines to eliminate aliasing artifacts without having to compute intersection volumes for each pixel.

Figure 2:
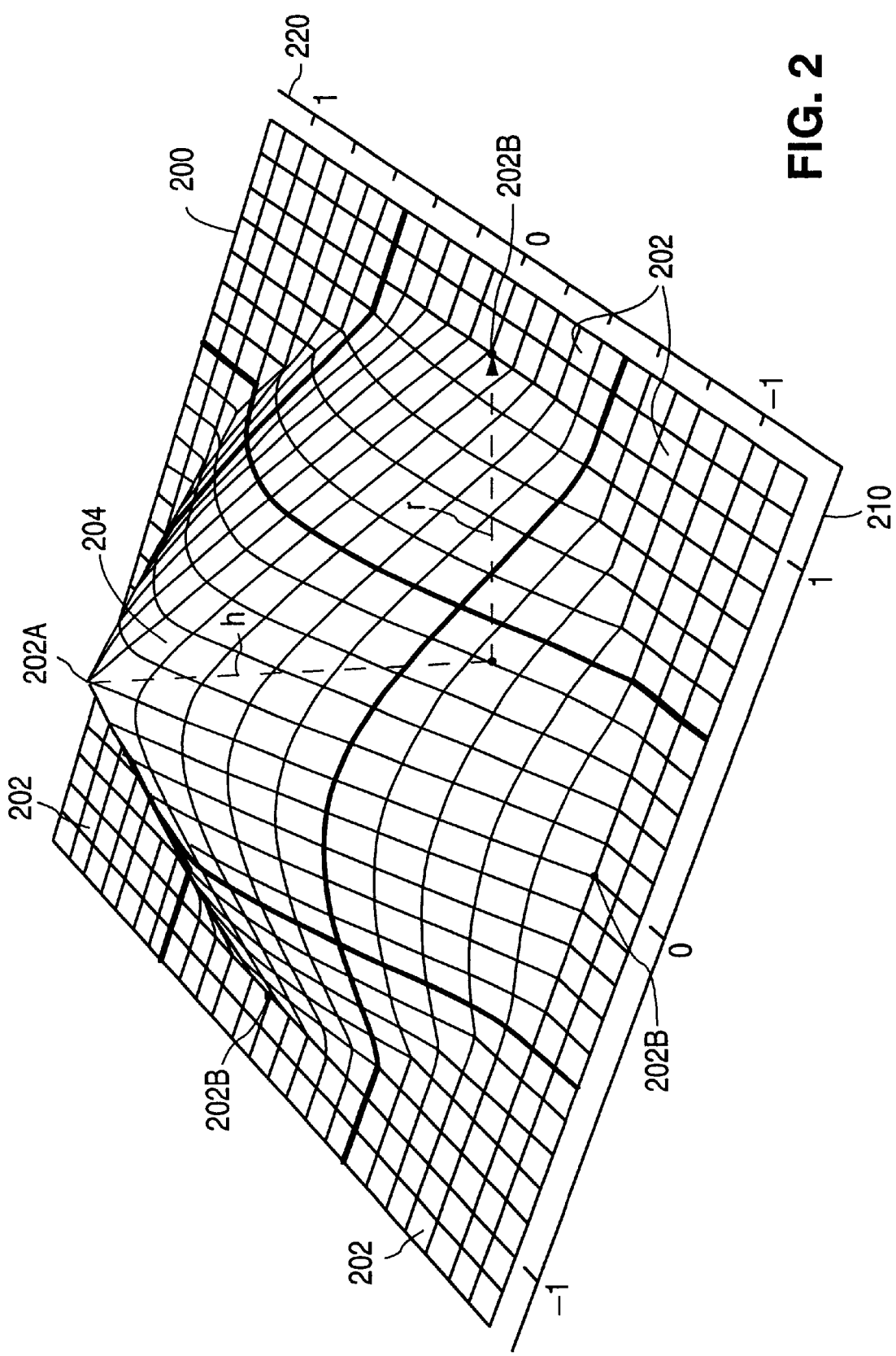
FIG. 2 illustrates a pixel grid with a three-dimensional filter cone positioned over the center of a pixel in the grid.

FIG. 2 shows a grid 200 of pixels 202 with thick, dark lines delineating each pixel 202. The thinner, lighter grid lines provide relief. The x-axis 210 runs in the foreground from left to right, and the y-axis 220 runs from front to back. Pixel centers are at integer (x, y) coordinates. For example, pixel center 202A is at coordinate (0, 0), and the corners of the square defining the pixel with pixel center 202A are (−0.5, −0.5), (−0.5, 0.5), (0.5, 0.5), and (0.5, −0.5). A filter function, a cone 204, is positioned over the pixel center 202A. This conical filter function 204 is exemplary; other filter functions can be used.

At the pixel center 202A, the conical filter function 204 has a maximum value h, which corresponds to the height of the cone. From its maximum value at the pixel center 202A, the conical filter function decreases linearly to 0 at a radius r from the pixel center 202A. The filter cone 204 shown in FIG. 2 has an exemplary radius of one pixel. Consequently, the rim of the cone 204 reaches the centers 202B of the neighboring pixels. In practice, a filter radius that is too small will not average in enough data from neighboring pixels, leading to a ropy image, i.e., bands of bright and dark intensities oriented at an angle to the line 133. On the other hand, a filter radius that is too large will blur the line 133 by averaging too much data. The system 100 provides a programmable filter radius so that users can tune the image 132 to their satisfaction.

Figure 3:
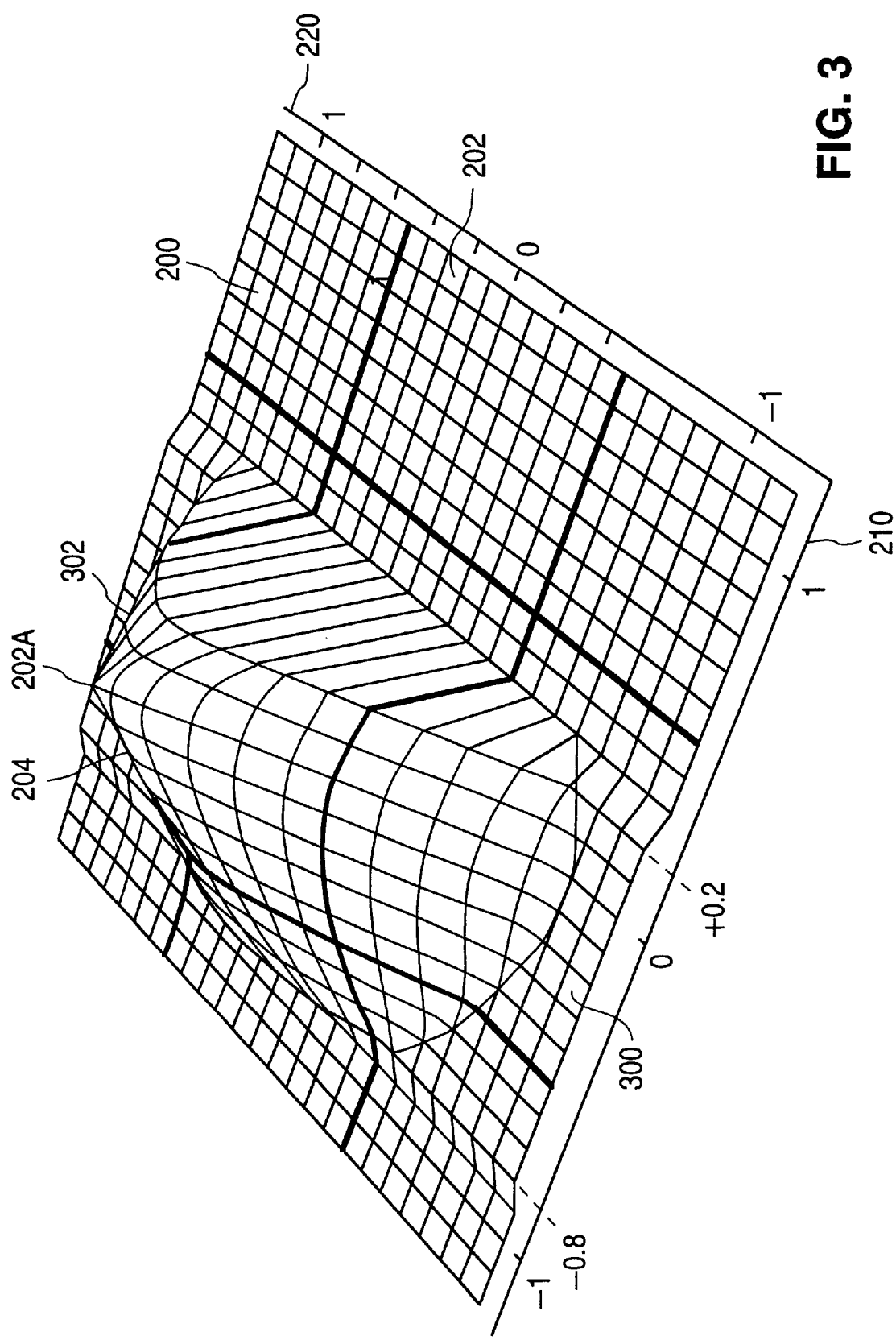
FIG. 3 illustrates the filter cone intersecting a line to produce a filter volume.

FIG. 3 shows the exemplary conical filter 204 positioned over the pixel center 202A. The cone 204 intersects an exemplary line 300 with a one-pixel width, referred to as a "width-1 line". The line 300 extends along the y-axis 220 bounded between −0.8 and +0.2 of the x-axis 210. For illustration purposes, the line 300 is shown as raised slightly above the plane of the pixel grid 200. The shaded area represents the 3-D intersection volume 302 between the cone 204 and the line 300. That part of the cone 204 that extends over the edges of the line 300 does not contribute to the intersection volume 302 and is shown as cut off.

The intersection volume 302 corresponds to the intensity given to the pixel 202A. When the range of computed intersection volumes is normalized between 0.0 and 1.0, a maximum intersection volume of 1.0 produces a maximum pixel intensity value of 1.0; a minimum intersection volume of 0.0, a minimum pixel intensity of 0.0. A maximum pixel intensity value of 1.0 means that the pixel 202A is given the full color and intensity of the line 300, and so the pixel 202A contributes to the line that is drawn, referred to as the antialiased line. A minimum pixel intensity of 0.0 means that the pixel 202A is not given any intensity that makes the pixel 202A appear as part of the antialiased line. The pixel 202A, in this instance, will have a different color than the line 300, such as, for example, a background color.

Pixels 202 that are exterior to the width-1 line 300, but closer to the line 300 than the radius of the cone filter 204, will produce an intersection volume between 0.0 and 1.0. Such pixels 202 are given an intermediate pixel intensity value between 0.0 and 1.0 corresponding to their intersection volume. For example, an intersection volume of 0.2 corresponds to an intensity value of 0.2. Thus, these pixels 202 become part of the antialiased line. Consequently, the resulting antialiased line is wider and longer than the width-1 line 300.

Theoretically, the height h of the filter cone 204 is pre-selected so that the volume of the filter cone is 1.0. This can, however, lead to slightly dim lines when the diameter of the filter cone 204 is wider than the line. To illustrate, when the cone 204, with its one-pixel radius, is centered over the width-1 line 300, the cone 204 extends over the edges of the line 300. While this particular placement of the cone 204 produces the maximum intersection volume with the line 300, it nonetheless produces an intersection volume that is less than the volume of the cone because the cone partially overlaps the line 300. Thus, the maximum intersection volume is less than 1.0, which produces a corresponding pixel intensity value that is less than 1.0. As a result, although a pixel may be at the center of the line 300, that pixel still receives less than the maximum pixel intensity and therefore appears dim.

To avoid dim lines, therefore, the height h of the filter cone 204 can instead be predetermined so that when the cone 204 is centered over a width-1 line, the resulting intersection volume is 1.0. Accordingly, as described below, the height h depends upon both the filter radius and line width.

Figure 4:
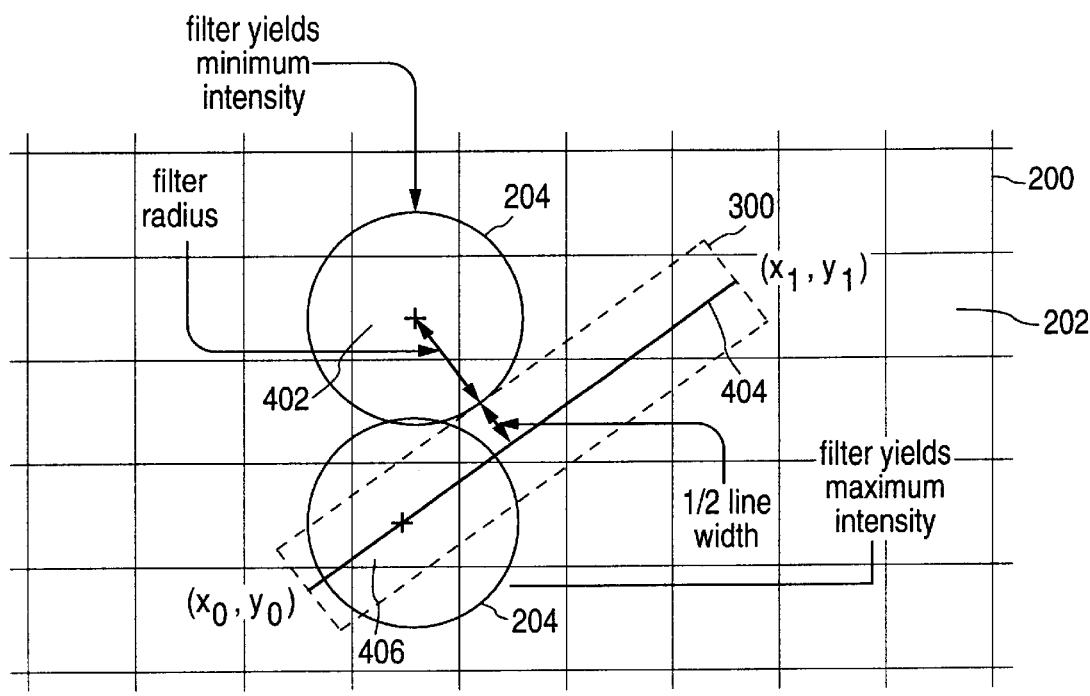
FIG. 4 illustrates a top view of two exemplary filter cones, one centered over a point exterior to the line, and the other centered over a point interior to the line.

FIG. 4 shows the exemplary conical filter 204 centered over a pixel 402 that is exterior to the width-1 line 300 (outlined by dashes). A line 404 between coordinates $(x_0, y_0)$ and $(x_1, y_1)$ indicates the center of the line 300. The center of the pixel 402 is spaced apart from the line 300 by the radius of the cone filter 204 and from the center 404 of the line 300 by an additional one-half of the line width. (The center of a pixel is the point of reference for the purpose of determining distances between pixels and edges or lines.) The intersection between the conical filter 204 and the line 300 produces an intersection volume of zero. The pixel 402, therefore, would be given a minimum intensity value. In general, when a pixel is spaced apart from the center of a line by at least the radius of the cone filter plus one-half the width of the line, that pixel is not intensified and does not become part of the antialiased line.

When the conical filter 204 is centered over a pixel 406 at the center 404 of the width-1 line 300, the intersection between the cone filter 204 and the line 300 yields the largest possible intersection volume. The pixel 406, therefore, is given the maximum intensity value. In general, when the distance of a pixel from the center 404 of the line 300 is 0, that pixel is maximally intensified.

Figure 5:
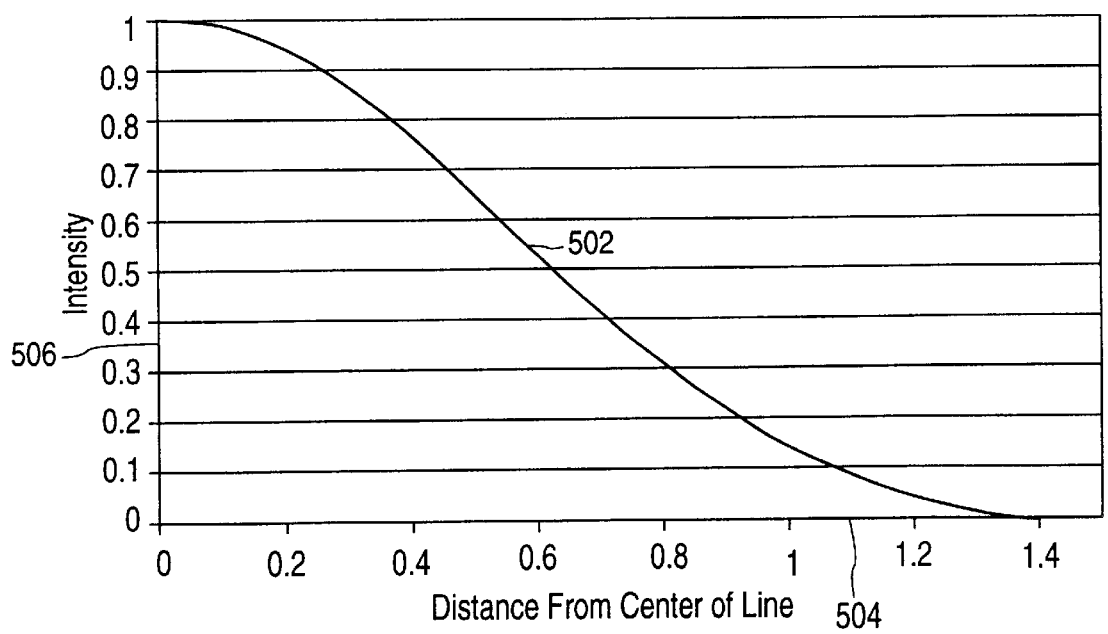
FIG. 5 is a graph showing an exemplary desired relationship between pixel intensities and the distance of pixels from the center of the line.

FIG. 5 is a graph 500 of an intensity function 502 showing how the intensity value given to a pixel decreases as the distance of that pixel from the center 404 of the line 300 increases. The horizontal axis 504 is the perpendicular distance, in units of pixels, of a pixel center from the center of the line 300. The vertical axis 506 is the intensity value given to pixels at the distances represented on the horizontal axis 504. The intensity values range from 0.0 to 1.0.

The intensity function 502 was obtained by determining the intersection volumes between the filter cone 204, with a one-pixel radius, and the width-1 line 300 for pixels at various distances from the line 300. The height h of the filter cone 204 is predetermined so that the maximum intersection volume is 1.0. When the pixel center 406 is at the line center 404, the perpendicular distance of the pixel from the center of the line is 0.0. Centering the conical filter 204 over the pixel 406 produces the maximum intersection volume of 1.0, and so the intensity value given to the pixel 406 is 1.0. When the distance of the pixel from the line center is greater than the filter radius plus one-half the line width, the intensity value is zero because the intersection volume is zero. Pixel distances that produce intersection volumes between 0.0 and 1.0 receive corresponding intensity values. The shape of the intensity function 502 shown in FIG. 5 represents the relationship between distances of pixels from the line 300 and intensity values for those pixels.

This shape of the intensity function 502 applies, in general, whenever the radius of the conical filter equals the width of the line. For example, the intensity function 502 can be used for a line that is 2.0 pixels wide and a conical filter with a radius of 2.0 pixels, as long as the distances on the horizontal axis 504 are rescaled to reflect the filter radius and line width. For instance, the minimum intersection volume in this example occurs at a distance of 3.0 pixels, i.e., at the distance of the filter radius plus one-half the line width.

To implement the intensity function 502 in the system 100, a table can store the range of intensity values and use distances as indices into the table. Then upon determining the distance of a pixel from the center of a line, this distance is mapped to an intensity value for that pixel directly from the table. In their above-mentioned paper, Satish Gupta and Robert F. Sproull describe this implementation incorporated by reference herein. This implementation, however, does not work properly for antialiasing endpoints of a line; they use a different, special table to determine pixel intensities near the ends of a line.

Figure 6:
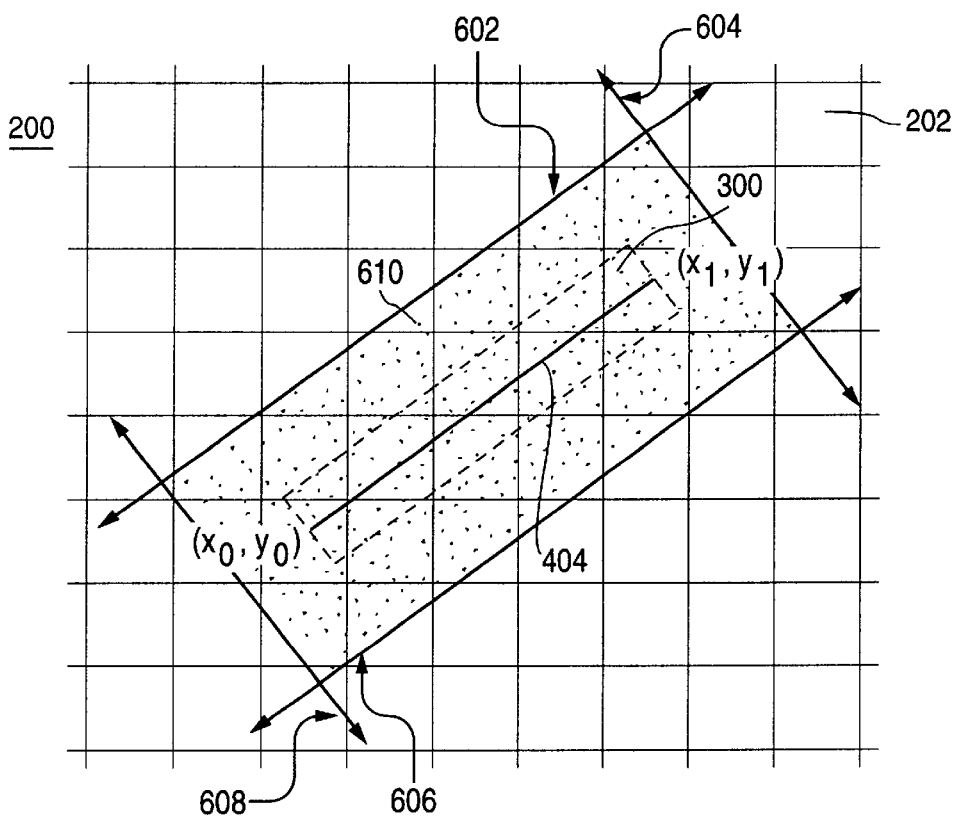
FIG. 6 shows the desired line to be antialiased surrounded by edges that form the bounds of the antialiased line.

FIG. 6 shows the desired line 300 surrounded by four edges 602, 604, 606, 608 that form the bounds of the antialiased line. The bounded area 610 is shaded. These edges 602, 604, 606, 608 define the boundaries at which pixels 202 on an edge or exterior to the bounded area 610 receive a minimum intensity value of 0.0, i.e., each edge 602, 604, 606, 608 is spaced apart at a distance from the line 300 such that a pixel on an edge would produce an intersection volume of 0.0 with the line 300. Consequently, such pixels are not part of the antialiased line 610.

The present invention, instead of directly computing the distance of each pixel from the center 404 of the line 300, computes the distance of each pixel from the edges surrounding the line 300. By changing the reference from which distance is measured, the process of antialiasing the endpoints of the line 300 becomes simplified. For one, unlike Gupta and Sproull's implementation, a special table for handling endpoints is unnecessary.

Because distance is computed from the edges of the bounded area 610, and not from the center of the line 300, the relationship between intensity values and pixel distances is reversed from that described by the intensity function 502 shown in FIG. 5. For example, when a pixel is at a distance of 0 from an edge, the intensity value for that pixel is 0.0, whereas in FIG. 5, for a distance of 0, the intensity value would be 1.0. Also, as the distance from the edge increases in the direction of the line 300, the intensity value increases, whereas in FIG. 5, intensity values decrease with increased distance.

Figure 7:
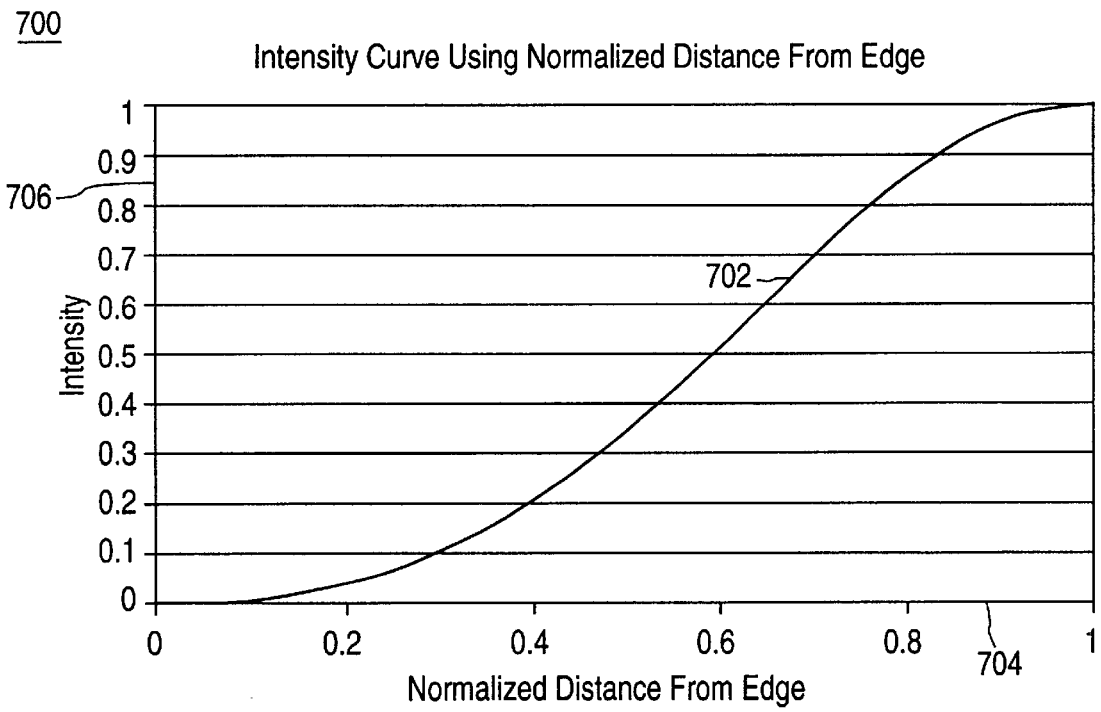
FIG. 7 is a graph showing an exemplary desired relationship between pixel intensities and the distance of pixels from the edge of the antialiased line.

FIG. 7 shows a graph 700 of an intensity function 702 representing the relationship between intensity values and distances of pixels from edges of the bounded region 610. The horizontal axis 704 is the scaled distance of a pixel from an edge of the region 610. Distances are scaled to normalize the domain of intensity function 702 for different line widths and filter radii when drawing antialiased lines. Scaled distances are described below in connection with FIG. 9. As a result of scaling, the distances on the horizontal axis 704 range from 0.0 to 1.0. The vertical axis 706 is the range of intensity values for pixels at the scaled distances represented on the horizontal axis 704. The intensity function 702 is at a minimum intensity value of 0.0 at a distance of 0.0 and at a maximum intensity value of 1.0 at a distance of 1.0.

The intensity function 702 can be implemented using a lookup table. The table stores intensity values in the range from 0.0 to 1.0. The system 100 can compute the intersection volumes and store the corresponding intensity values in the table at design time or during software boot-up. For best results, the table should include at least 32 entries, with each entry including at least 5 bits for storing the intensity value. Each entry in the table maps a pixel distance from an edge into an intensity value. The table can be hard-wired or loadable by software.

The intensity function 702 is most accurate for a line width to filter radius ratio of 1:1. When either the filter radius or line width changes, for best results, the entries of a loadable table should be computed again. For a hardwired table, however, the curve 702 produces effectively antialiased lines for a wide range of line width to filter radius ratios.

Figure 8:
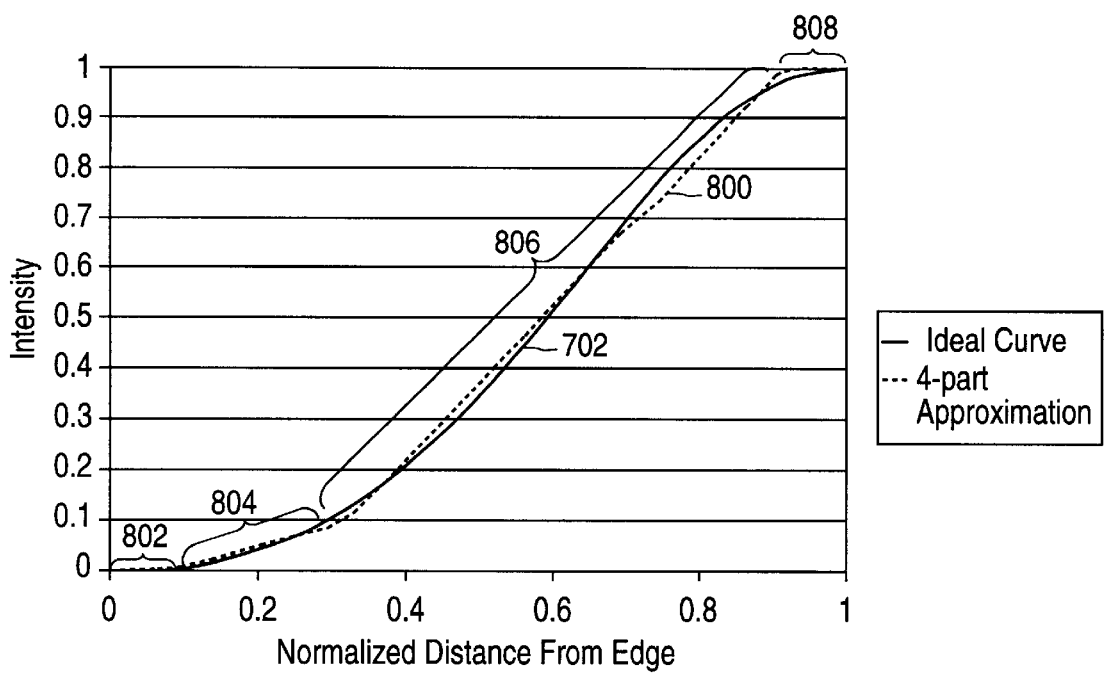
FIG. 8 is a graph showing an approximation of the relationship in FIG. 7 using piece-wise linear approximation.

Alternatively, the intensity function 702 can be implemented in hardware using a piece-wise linear approximation 800. FIG. 8 shows an exemplary four-piece approximation 800 of the intensity function 702. At each end, the approximation 800 uses a constant intensity value to approximate the intensity function 702. For distances near 0, the constant intensity value 802 is 0.0; and for distances near 1, the constant intensity value 808 is 1.0. A shallowly sloping section 804 approximates distances close to an edge. Section 804 is important for maintaining good high-frequency rejection. Section 806 approximates a central portion of the intensity function 702 using a slope that is four times the slope of the shallow section 804. In practice, the piece-wise linear approximation yields images that are nearly indistinguishable from images produced using the intensity function 702. Other approximations can be used to represent the intensity function 702, such as, for example, a three-piece approximation where sections 804 and 802 are combined in a single section.

Edge Functions

Each of the edges 602, 604, 606, 608 shown in FIG. 6 can be described by an edge function, E(x, y). Edge functions define a directed edge between two points that divides a plane into two halves. For example, the edge function for a directed edge with a start coordinate at $(x_0, y_0)$ and an end coordinate at $(x_1, y_1)$ is:

$$E(x, y)=(x-x_0)*\Delta y-(y-y_0)*\Delta x$$

where $$\Delta x=(x_1-x_0)$$

and $$\Delta y=(y_1-y_0)$$

An edge function, E(x, y), is positive for pixels in the right half of the divided plane, negative for pixels in the left half of the divided plane, and zero for pixels exactly on the directed edge. Edge functions are described in detail by Juan Pineda in "A Parallel Algorithm for Polygon Rasterization", ACM Computer Graphics, Vol. 22, No. 4, August 1988, incorporated by reference herein. Given the value E(x, y) at a particular pixel in the pixel grid 200, the edge function for neighboring pixels can be incrementally computed. For example:

$$E(x+1, y)=E(x, y)+\Delta y,$$

$$E(x-1, y)=E(x, y)-\Delta y,$$

$$E(x, y+1)=E(x, y)-\Delta x, \text{ and}$$

$$E(x, y-1)=E(x, y)+\Delta x.$$

Distance Functions

Figure 9:
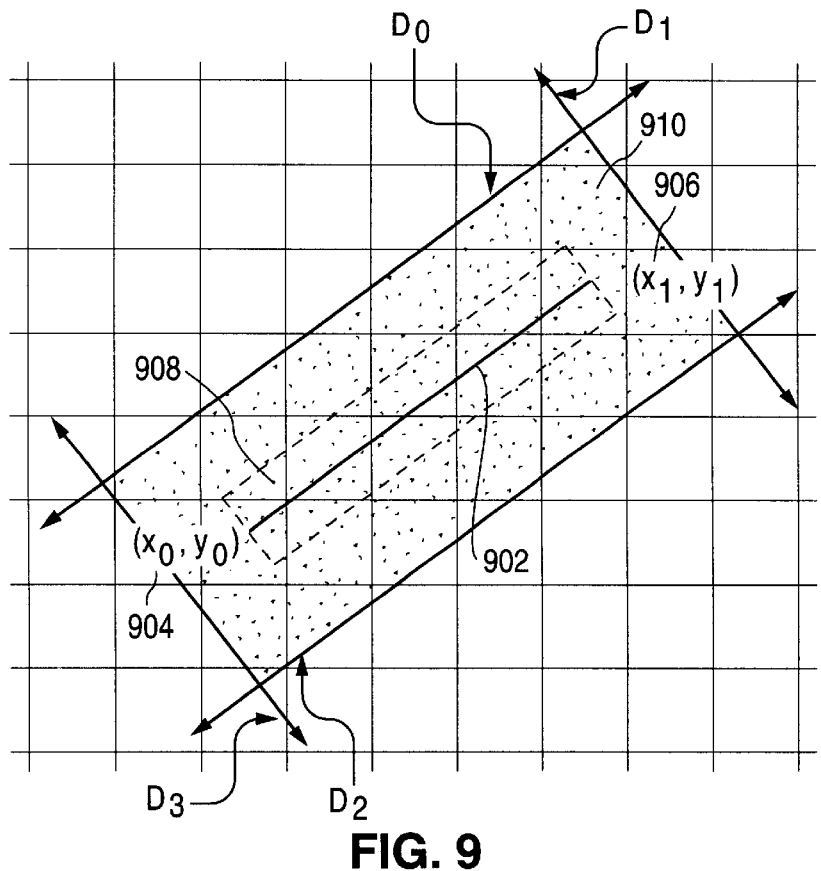
FIG. 9 shows the desired line to be antialiased surrounded by edges defined by four distance functions.

FIG. 9 shows distance functions $D_0(x, y)$, $D_1(x, y)$, $D_2(x, y)$, and $D_3(x, y)$, surrounding an exemplary line 908 to be antialiased, forming a bounded region 910. Line 908 is outlined by dashes and referred to as the desired line. Line 902 is an infinitely thin line between start point $(x_0, y_0)$ 904 and end point $(x_1, y_1)$ 906. Line 902 has a width of 0 pixels, called a width-0 line, and represents the center of the desired line 908.

Each distance function $D_0, D_1, D_2, D_3$ defines a directed edge that is derived by multiplying a corresponding edge function, $E_0, E_1, E_2, E_3$, by a scale factor; that is, $$D(x, y)=E(x, y)*\text{scale\_factor}.$$

For example, the distance functions $D_0, D_1, D_2, D_3$ will measure distances in units of pixels if the scale factor is the reciprocal of the Euclidean length of the line 902. The Euclidean length of line 902 is expressed as the square root (sqrt) of $(x_1-x_0)^2+(y_1-y_0)^2$. Each distance function, $D(x, y)$, is obtained by multiplying the corresponding edge function, $E(x, y)$, by the reciprocal of the length of the line 902, that is:

$$D(x, y)=E(x, y)*1/\sqrt{((x_1-x_0)^2+(y_1-y_0)^2)}.$$

Thus, the scale factor converts the terms of an edge function, $E(x, y)$, into terms of distance, and, as a result, each distance function $D_0$, $D_1$, $D_2$, $D_3$ becomes a slope-independent Euclidean distance function.

Two distance functions, $D_0$ and $D_2$, are parallel to the width-0 line 902, one on each side of the desired line 908. In this context, a distance function is "parallel to a line" when the edge described by $D(x, y)=0$ is parallel to the that line. The direction of $D_0$ is from the start point $(x_0, y_0)$ 904 toward the end point $(x_1, y_1)$ 906; the direction of $D_2$ is from the end point $(x_1, y_1)$ 906 toward the start point $(x_0, y_0)$ 904.

The distance of $D_0$ and $D_2$ from the width-0 line 902 is a function of the width of the desired line 908 and the radius of the conical filter. For example, when the filter diameter is larger than the line width, the two directed edges, $D_0$ and $D_2$, are spaced apart from the width-0 line 902 by the sum of one-half the width of the desired line 908 and the radius of the conical filter. The intensity of pixels on and outside of the edges defined by $D_0$ and $D_2$ are unaffected by the desired line 908. (The "outside" is the side of the edge opposite that of the line 908.)

The distance functions $D_1$ and $D_3$ are perpendicular to the width-0 line 902, one at each end of the line 902. A distance function is "perpendicular to a line" when the edge described by $D(x, y)=0$ is perpendicular to that line. The direction of $D_1$ is from the edge defined by $D_0$ to the edge defined by $D_2$; and the direction of $D_3$ is from the edge defined by $D_2$ to the edge defined by $D_0$.

The distances of $D_1$ from the end point $(x_1, y_1)$ 906 and $D_3$ from the start point $(x_0, y_0)$ 904 are a function of the filter radius and, optionally, of the width of the desired line 908. The two directed edges, $D_1$ and $D_3$, are spaced apart from the end point 906 and start point 904, respectively, by a distance of the radius of the conical filter. Pixel centers at these edges or exterior to the bounded region 910 do not become part of the antialiased line. Optionally, the antialiased line can be more smoothly connected with other lines by moving the edges defined by $D_1$ and $D_3$ farther from the points 904, 906 by one-half of the desired line width, to project the desired line 908 past the start point 904 and the end point 906.

As shown in FIG. 9, the directed edges defined by the distance functions $D_0$, $D_1$, $D_2$, and $D_3$ surround the desired line 908. Pixels that are surrounded by all four distance functions would produce a positive intersection volume with the desired line 908. Each of the four distance functions has a non-negative value for those pixels. Consequently, such pixels become part of the antialiased line.

Given a value, $D(x, y)$, at a particular pixel $(x, y)$ in the pixel grid 200, the distance function for neighboring pixels can be incrementally computed as follows:

$$D(x+1, y)=D(x, y)+\Delta sy,$$

$$D(x-1, y)=D(x, y)-\Delta sy,$$

$$D(x, y+1)=D(x, y)-\Delta sx, \text{ and}$$

$$D(x, y-1)=D(x, y)+\Delta sx,$$

where $$\Delta sx=\Delta x*\text{scale\_factor}$$

and $$\Delta sy=\Delta y*\text{scale\_factor}.$$

To use the above-described look-up table or the piece-wise linear approximation when mapping pixel distances to pixel intensity values, the distance functions need to produce a distance value of 0.0 for pixels on the corresponding edge and to produce a distance value of 1.0 for pixels that are exactly the distance from the edge at which the intensity reaches its maximal value. Accordingly, the scale factor includes an additional factor, called a filter_scale; that is, $$\text{scale\_factor}=1/\sqrt{((x_1-x_0)^2+(y_1-y_0)^2)}*\text{filter\_scale}.$$

To normalize the distance values to this input range, a normalized distance of 1.0 is defined as the Euclidean distance through which a filter 204 moves from a zero intersection volume to a maximum intersection volume with the desired line 908. In the case of a 1:1 ratio between the desired line width and the filter radius, the minimum intersection volume occurs when the filter is centered over a pixel that is spaced apart from the desired line 908 by a distance of the filter radius. The maximum intersection volume occurs when the filter 204 is over the center 902 of the desired line 908, i.e., the filter 204 is midway into the line 908, which is one-half of the desired line 908 width. Because of the 1:1 ratio, this distance also equals one-half of the filter radius. The distance through which the filter 204 moves to go from a maximum to a minimum intersection volume is 1.5 times the radius of the filter 204.

In general, when the ratio between the desired line width and the filter radius is 1:1, the filter_scale is the reciprocal of 1.5 times the filter radius. To illustrate using an exemplary filter radius of 1.0 pixels, a distance function needs to produce a scaled distance value of 1.0 when a pixel is at the center 902 of the line 908 and a scaled distance value of 0.0 when a pixel is at a distance of 1.5 pixels from the center 902 of the line 908.

To take into account different ratios between the desired line width and the filter radius, the filter_scale uses a more complex scaling that is a function of both the filter radius and the line width. Two exemplary instances that use more complex scaling include: (1) when the filter diameter is larger than the width of the desired line, and (2) when the line width is larger than the filter diameter.

Returning to FIG. 4, shown is an exemplary instance where the filter diameter is larger than the width of the desired line 300. The maximum intersection volume between the filter 204 and the line 300 occurs when the filter 204 is over the center 404 of the line. The filter 204 is midway into the line 908, which is one-half of the desired line 908 width. The minimum intersection volume occurs when the filter does not intersect the line 300, which is when the filter is centered over a pixel that is spaced apart from the line 300 by a distance of the filter radius. The distance, therefore, through which the filter 204 moves, to go from a maximum to a minimum intersection volume, is one-half the line width plus the filter radius. In general, when the ratio between the desired line width and the filter radius is less than 1:2, the filter_scale is the reciprocal of one-half the line width plus the filter radius.

Figure 10:
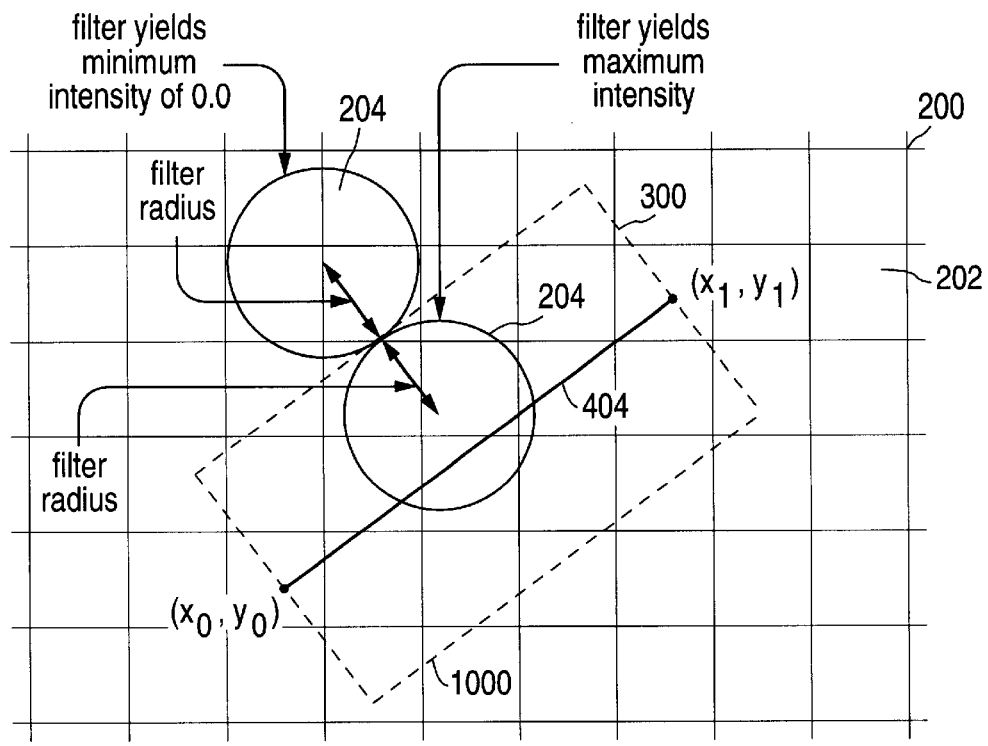
FIG. 10 shows two particular filter cone positions with respect to a line to be antialiased that produce the minimum intersection and the maximum intersection volumes with that line where the filter diameter is less than the line width.

FIG. 10 illustrates an exemplary instance when the filter diameter is smaller than the width of the desired line 1000 (outlined by dashes). The maximum intersection volume occurs when the filter 204 is completely enclosed by the line 1000, which is when the filter is centered over a pixel that is just inside the line 300 by a distance of the filter radius. The minimum intersection volume occurs when the filter 204 does not intersect the line 1000, which is when the filter is centered over a pixel that is spaced apart from the line 1000 by a distance of the filter radius. The distance, therefore, through which the filter 204 moves, to go from a maximum to a minimum intersection volume, is twice the radius of the filter 204. In general, when the ratio between the desired line width and the filter radius is greater than 2:1, the filter_scale is the reciprocal of twice the filter radius.

To simplify computations when using the piece-wise linear approximation, the filter_scale can be scaled even further by a constant, c, which is dependent upon the number of bits of precision used. All such scaling factors can be considered together, as shown by the following exemplary psuedo-code:

```
if (line width > 2 * filter radius)
    filter_scale = 1/ (2 * filter radius)
else
    filter_scale = 1 / (filter radius + ½line width)
endif
    filter_scale = filter_scale * c
    scale_factor = filter_scale * 1/ sqrt((x₁ - x₀)² + (y₁ - y₀)²)
```

When scaling distance functions to produce a value in the range from 0.0 to 1.0, negative values produced by a distance function are clamped at 0.0, and positive values greater than 1.0 are clamped at 1.0, before the distances are used to compute an intensity.

Figure 11:
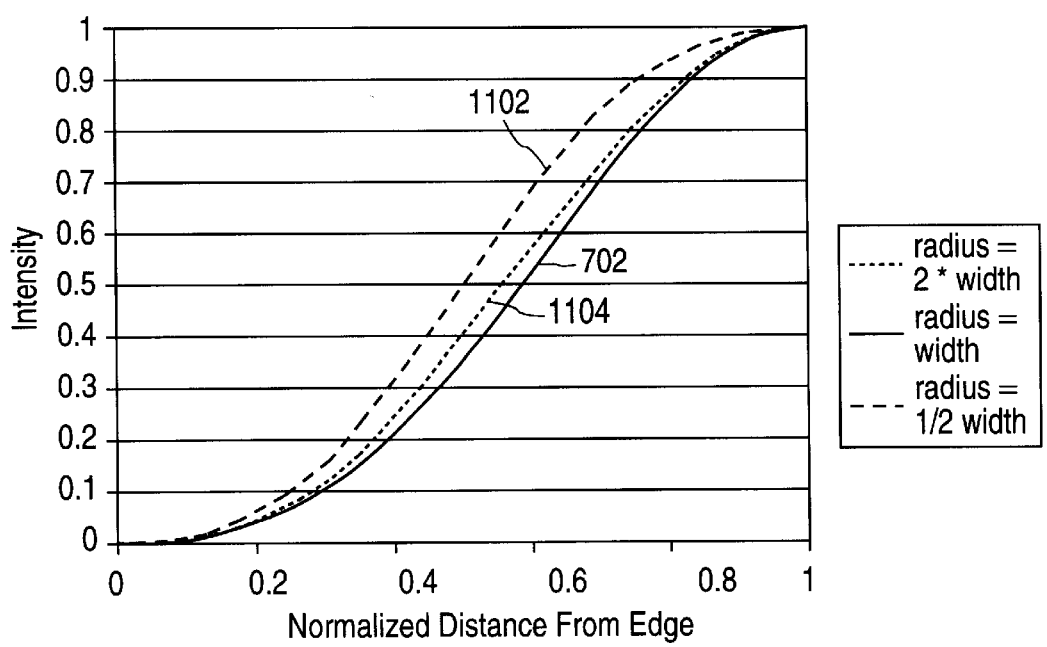
FIG. 11 is a graph showing the relationship between pixel intensities and distance of pixels from the edge of the antialiased line for different ratios between the filter radius and line widths.

FIG. 11 is a graph showing the intensity functions for different line width to filter radius ratios. The intensity function 702, which is also shown in FIG. 7, is for a line width to filter radius ratio of 1:1. Intensity function 1102 represents the relationship between distance and intensity values for a line width to filter radius ratio of 2:1; intensity function 1104 represents the relationship for a line width to filter radius ratio of 1:2. Because of similarity among the curves 702, 1102, 1104, a single intensity function could be used to represent the relationship for each of the ratios. Nonetheless, for more accurate results, the values stored in the lookup table can be computed again to accommodate a particular line width to filter radius ratio.

Intensity Function and Overall Distance Function

The intensity values I(x, y) for pixels can be determined by partially combining the individual distance functions $D_0$, $D_1$, $D_2$, $D_3$ and performing a multidimensional table lookup, or by using several one-dimensional lookups and combining the results; or from combining the distance functions $D_0$, $D_1$, $D_2$, $D_3$ into an overall distance function, $D_{all}(x, y)$, and using a single one-dimensional table lookup.

In the case where the overall distance function, $D_{all}(x, y)$, is used to determine I(x, y), $D_{all}(x, y)$ is 0 when any of the four distance functions $D_0$, $D_1$, $D_2$, $D_3$ is non-positive for the pixel at (x, y); and $D_{all}(x, y)$ is greater than 0 when all the distance functions $D_0$, $D_1$, $D_2$, $D_3$ are positive at (x, y). The distance value of $D_{all}(x, y)$ maps to an intensity value, I(x, y), through either (1) the lookup table or (2) the piece-wise linear approximation. The intensity value is in the range from 0.0 and 1.0.

Figure 12:
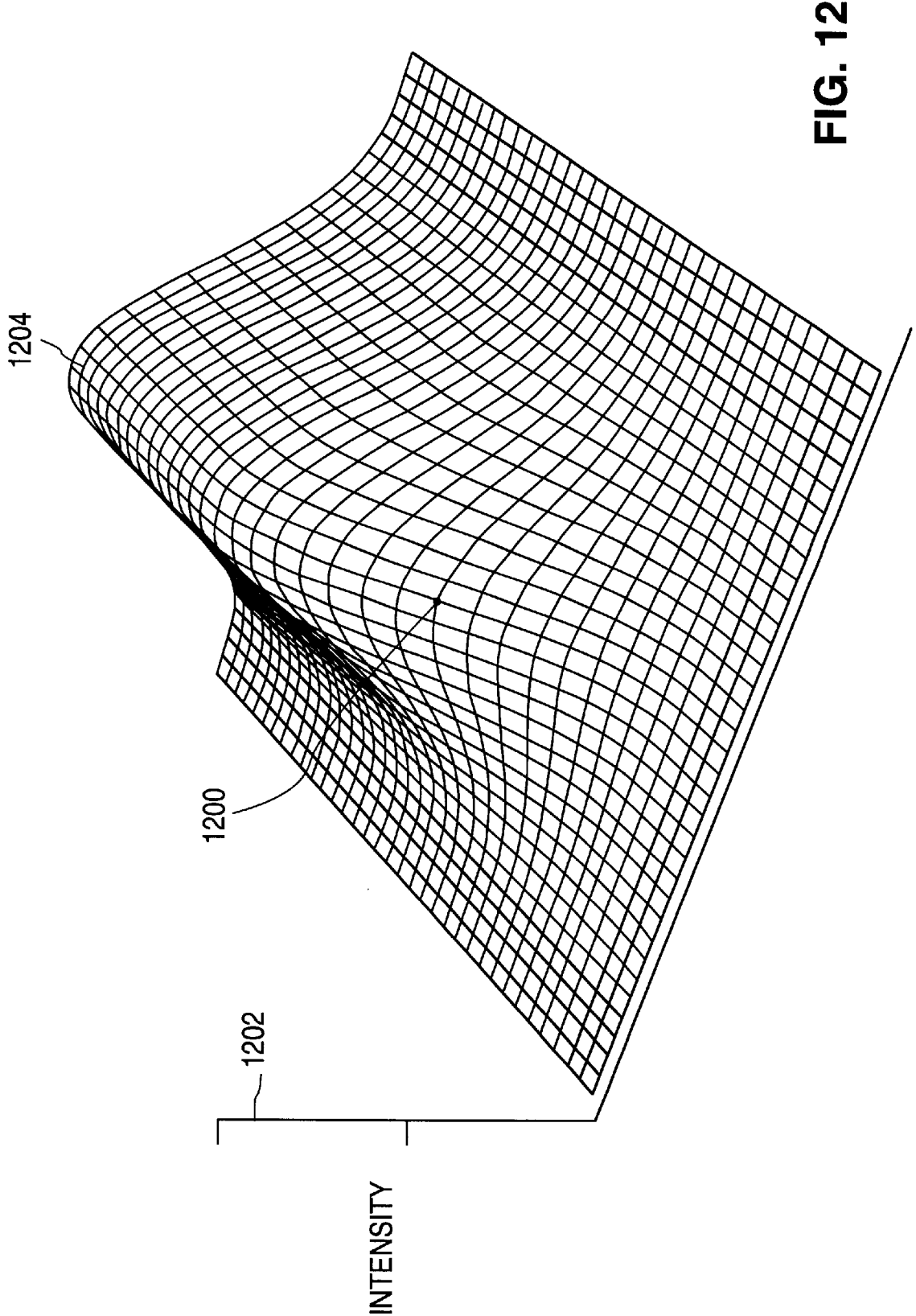
FIGS. 12–15 are various graphs of the intensity values for endpoints of the line produced by practicing the principles of the invention.

For reference, FIG. 12 shows a graph of the desired intensity values near an endpoint 1200 of an exemplary line 1204. The graph is the result of computing intersection volumes at several points at or near the endpoint 1200 to determine their intensity values. (The vertical axis 1202 represents the range of intensity values.) The rounded tip at the endpoint 1200 of the line 1204 is the desired antialiasing result.

There are several ways of varying complexity to compute $D_{all}$, each way can affect the final image quality. One way to compute the overall distance $D_{all}$ is:

$$D_{all} = \text{minimum}(D_0, D_1, D_2, D_3).$$

Figure 13:
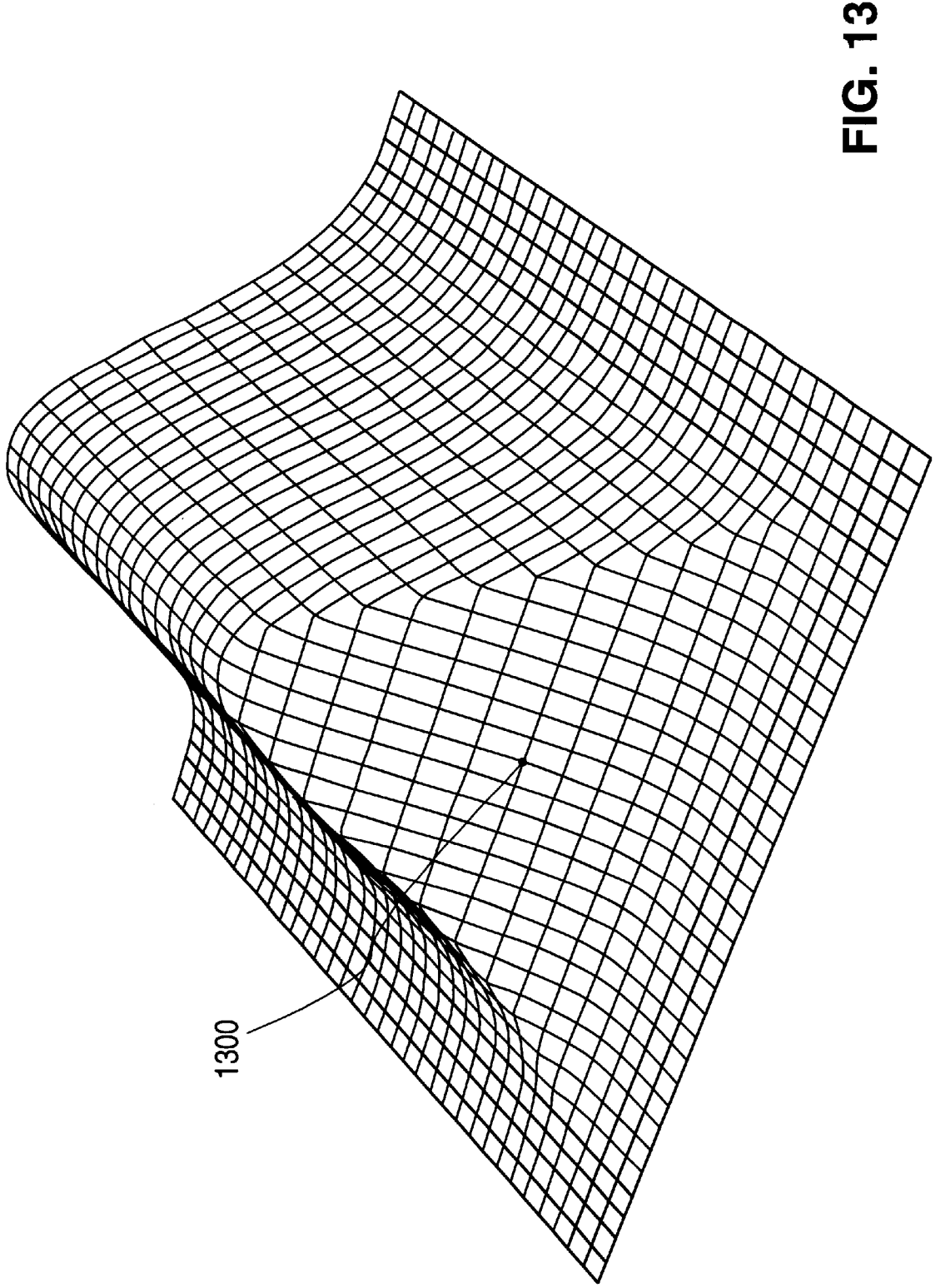

FIG. 13 shows a graph of the intensity values near an endpoint 1300 of an exemplary line as a result of using the minimum of the four values produced by the distance function $D_0$, $D_1$, $D_2$, $D_3$. An advantage of this technique is that it is easy to determine this minimum. Also, when the desired line width is not narrower than the filter radius, and the desired line projects beyond each endpoint by a distance of the filter radius plus half the line width, the distance functions always satisfy the following relationship:

$$(D_0 == 1.0 \text{ OR } D_2 == 1.0) \text{ AND } (D_1 == 1.0 \text{ OR } D_3 == 1.0).$$

Thus, in this instance, $D_0$ does not need to be compared to $D_2$, nor does $D_1$ need to be compared to $D_3$. Simply, when $D_0$ equals 1.0, then $D_2$ is the minimum of $D_0$ and $D_2$; otherwise $D_0$ is the minimum. Similarly, when $D_1$ equals 1.0, then $D_3$ is the minimum of $D_1$ and $D_3$; otherwise $D_1$ is the minimum. Thus, if desired, only a comparison between the minimum of $D_0$ and $D_2$ ($\min(D_0, D_2)$) and the minimum of $D_1$ and $D_3$ ($\min(D_1, D_3)$) can be used to produce $D_{all}$. This can be expressed in exemplary psuedo-code as:

$$\min(D_0, D_2) = \text{if } (D_0 == 1.0) \text{ then } D_2 \text{ else } D_0 \text{ endif}$$

$$\min(D_1, D_3) = \text{if } (D_1 == 1.0) \text{ then } D_3 \text{ else } D_1 \text{ endif}$$

$$D_{all} = \min(\min(D_0, D_2), \min(D_1, D_3))$$

In practice, filter radius and line width selections that do not strictly satisfy the above-mentioned conditions are close enough so that any errors that may occur are small enough to be ignored.

Another way to compute the overall distance $D_{all}$ uses the above-described relationship among the distance functions:

$$D_{all} = \min(D_0, D_2) * \min(D_1, D_3).$$

Figure 14:
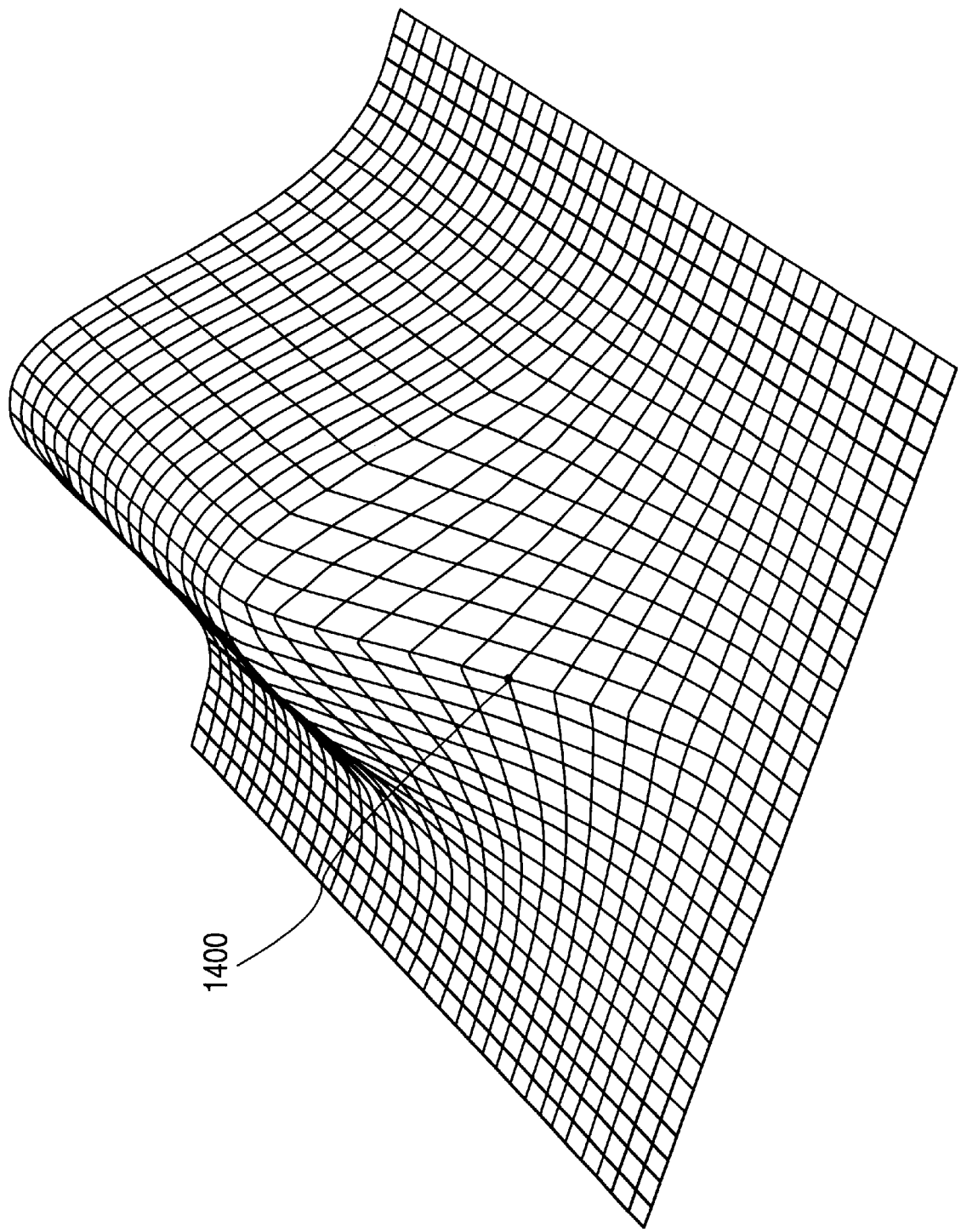

This computation can be used even if, in fact, the relationship among the distance functions does not hold. FIG. 14 shows a graph of the intensity values near an endpoint 1400 of an exemplary line as a result of multiplying the two minima expressions.

Yet another way to compute the overall distance $D_{all}$ is to multiply the distance functions together as follows:

$$D_{all} = D_0 * D_1 * D_2 * D_3.$$

In the case where the intensity values for pixels are computed by partially combining the individual distance functions $D_0$, $D_1$, $D_2$, $D_3$, the overall distance $D_{all}$ is not computed. For example, an intensity value is obtained for each of the distance functions using either the lookup table or the piece-wise linear approximation. The intensity value for a given pixel is then the product of the four intensity values. This technique works if the intensity curve has been normalized to have a maximum value of 1. However, if an intensity function is desired in which the filter volume has been normalized to have a volume of 1, such that the maximum intensity value may be less than 1, then another technique is required. One of the distance functions (for example, $D_0$) can look up an intensity value from a table that has the filter volume normalized to 1, while the other three functions can look up an intensity value from a table that has the maximum intensity normalized to 1. Alternatively, all distance functions can look up an intensity value from a table in which the maximum intensity value is normalized to 1, and then the result can be multiplied by the maximum intensity value attainable when the filter volume is normalized to 1.

Figure 15:
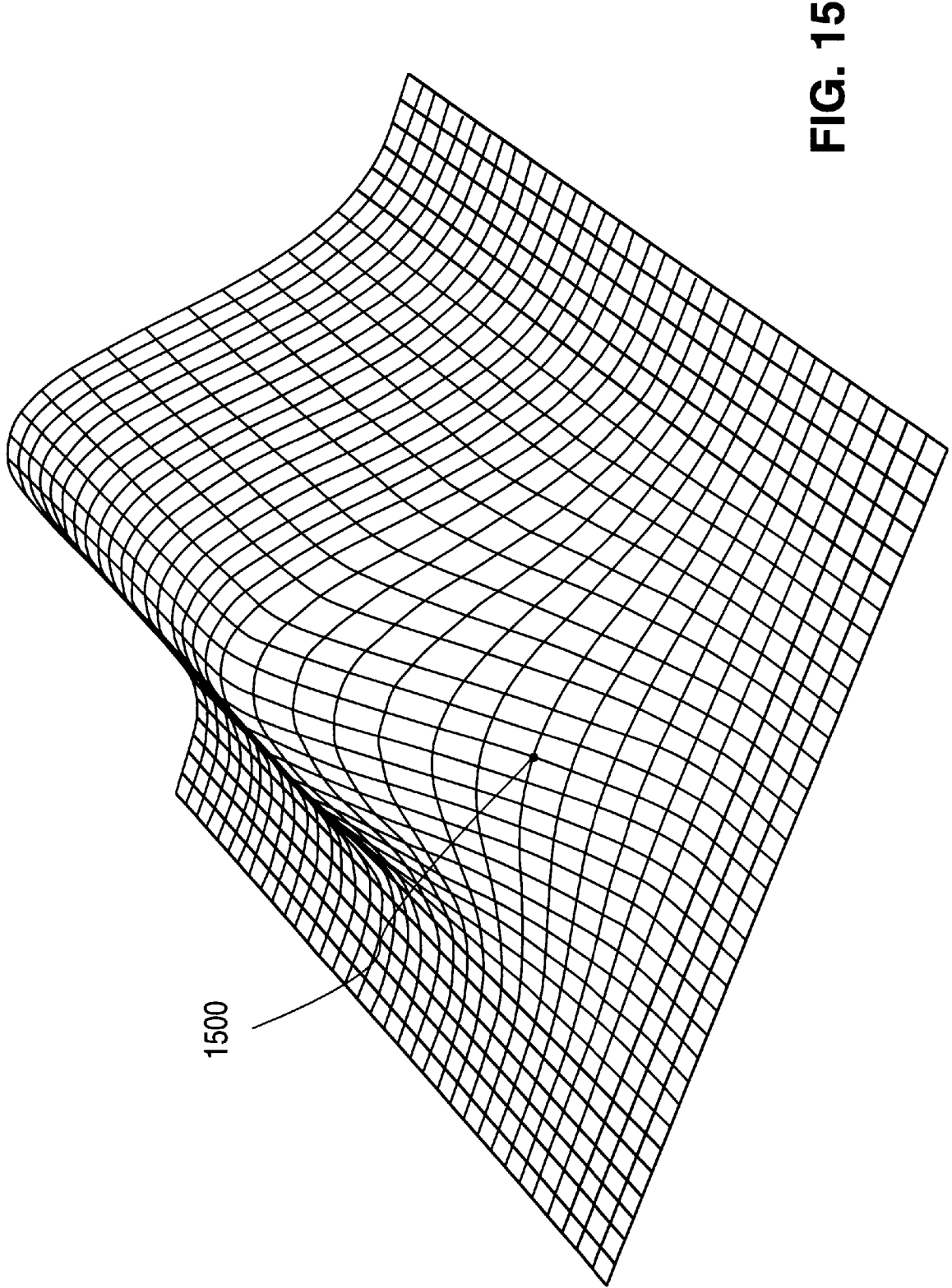

As another example, an intensity value is obtained for each of the two minima, min($D_0$, $D_2$) and min($D_1$, $D_3$), with the intensity value for the pixel being the product of the two intensity values. For example:

I(x, y)=integral_table_1D[min($D_0$, $D_2$)]*integral_table_1D[min($D_1$, $D_3$)], where integral_table_1D is an exemplary array variable representing the lookup table. FIG. 15 shows a graph, produced using this array variable, of the intensity values near an endpoint 1500 of an exemplary line. The results closely resemble the reference graph shown in FIG. 12. Again, this needs minor modifications if the desired intensity curve does not have a maximal value of 1.

As another example, intersection volumes are computed at multiple places near the endpoint of a line. The intensity values corresponding to the computed intersection volumes are stored in a two-dimensional hardwired or RAM array, called integral_table_2D. The individual distance functions $D_0$, $D_2$, $D_3$ are used as an index into the array as exemplified by the following pseudo-code:

I(x, y)=integral_table_2D [min($D_0$, $D_2$), min($D_1$, $D_3$)].

The following exemplary pseudo-code combines the above-mentioned ways for converting the distance functions $D_0$, $D_1$, $D_2$, $D_3$ into an intensity value, I:

for a given pixel at (x, y). Such modifications are well known to those in the art.

Figure 16:
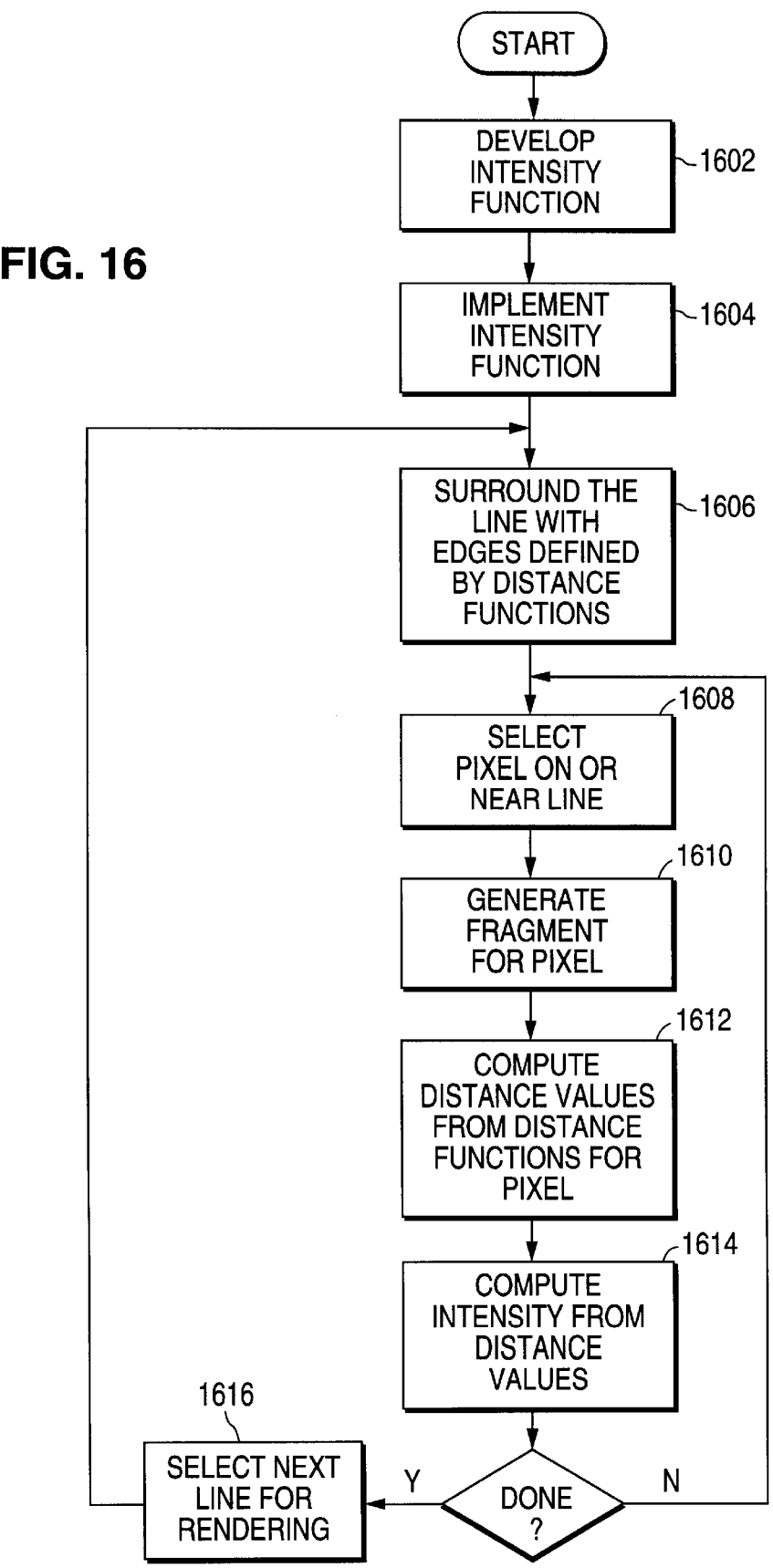
FIG. 16 shows a flow diagram illustrating an operation of the system of FIG. 1 when practicing the invention.

FIG. 16 illustrates an exemplary method for antialiasing a line according to the principles of the invention. At the time of design of the system 100 or while the system 100 powers-up, an intensity function is developed for mapping pixel distances from an edge to intensity values (step 1602). The shape of the developed intensity function may depend upon the ratio between the width of the line and the radius of a filter. When the filter radius and line width are programmable, it is desirable to compute a new, more accurate intensity function when the ratio between the line width and filter radius changes.

At step 1604, the intensity function is implemented by a lookup table or by hardware that approximates the intensity function in piece-wise fashion. In one embodiment, the range of distances used as input to the table is normalized and clamped to be in the range of 0.0 to 1.0.

At step 1606, edges defined by distance functions are placed around the line 300. Each distance function is an edge function that is multiplied by a scale factor equal to the reciprocal of the length of the line. When a particular implementation of the intensity function uses the normalized range of distance values, then an additional scale factor related to the line width and filter radius is also used so that the values produced by the distance functions are 0 when the intensity should be 0, and 1 when the intensity should be maximal.

At step 1608, traversal of the line to be antialiased begins with a pixel on or near the line. Using the exemplary line 300 in FIG. 4, for example, the initial pixel position would be selected to be near ($x_1$, $y_1$), the endpoint of the line 300. Traversal of the line, therefore, moves generally from the end of the line toward the beginning of the line. Again using the line 300 in FIG. 4 as an example, the traversal of the line 300 would move the selection of pixels toward the starting point ($x_0$, $y_0$).

```
if(D0 = = 0 OR D1 = = 0 OR D2 = = 0 OR D3 = = 0) then
        This pixel is not within the boundaries of the antialiased line.
        Process the next pixel.
endif
if (the line width is not narrower than the filter radius and the desired line
    projects beyond each endpoint by a distance of the filter radius plus half
    the line width, OR if otherwise unconcerned about the small errors that
    arise if such conditions are not met) then
        min(D0, D2) = if (D0 = = 1.0) then D2 else D0 endif
        min(D1, D3) = if (D1 = = 1.0) then D3 else D1 endif
else
        min(D0, D2) = if (D0 >= D2) then D2 else D0 endif
        min(D1, D3) = if (D1 >= D3) then D3 else D1 endif
endif
if (determining intensity value from a Dall function)
        if (using minimum function for combining D0, D1, D2, D3) then
                Dall = if (min(D0, D2) > min D1, D3)) then min(D1, D3)
                else min(D0, D2)
                endif
        elsif (multiplying all distance functions before lookup)
                Dall = D0 * D1 * D2 * D3
        elsif (using a single multiplication operation)
                Dall = min(D0, D2) * min(D1, D3)
        endif
        I = integral_table_1D[Dall]
elsif (multiplying all distance functions after lookup).
        I = integral_table_1D[D0] * integral_table_1D[D1]
            * integral_table_1D[D2] * integral_table_1D[D3]
elsif (using single multiply after lookup)
        I = integral_table_1D[min(D0, D2)] * integral_table_1D[min(D1, D3)]
else
        I = integral_table_2D[min(D0, D2), min(D1, D3)]
endif
```

The intensity values, I(x, y), are used to modify the intensity of the colors Red(x, y), Blue(x, y), and Green(x, y)

This traversal direction is particularly helpful where a series of antialiased lines overlap each other because each pair of lines in the series share an endpoint. If the overlapping fragments near each shared endpoint are generated closely in time, the processing of a second fragment may be stalled until the processing of a first fragment has completed. Drawing an antialiased line backwards, i.e., starting fragment generation at the end of the line and moving toward the start of the line, can avoid stalls by separating the generation of overlapping fragments further in time.

At step 1610, a fragment is generated for the pixel. At step 1612, distance values are computed from the distance functions for the selected pixel position. The computed distance values become associated with the fragment for that pixel. At step 1614, an intensity value for that pixel is determined from those computed distance values using the implemented intensity function. When the line is traversed, the next line can be selected for rendering at step 1616. Otherwise, the traversal of the line continues with the next selected pixel on or near the line at step 1608.

Although described within the context of antialiasing lines, the invention can be practiced within any other context where distances of pixels from edges are mapped into pixel intensities. Consequently, the principles of the invention are applicable to antialiasing points, lines, edges of polygons, etc. The foregoing description has been directed to specific embodiments of this invention. It will be apparent, however, that variations and modifications may be made to the described embodiments, with the attainment of all or some of the advantages. It is the object of the appended claims, therefore, to cover all such variations and modifications as come within the spirit and scope of the invention.

We claim:

1. A computerized method for rendering an image defined by pixels, comprising the steps of:

placing a mask a predetermined distance outside of a line of the image, the mask including a plurality of edges which bound the line, each of the plurality of edges being defined by distance evaluators;

selecting a pixel within the mask;

determining a distance value representing a distance of the selected pixel from a corresponding edge of the mask; and determining an intensity value for the selected pixel based upon the distance value, the determined intensity value improving the perceived quality of the images by reducing aliasing artifacts when the selected pixel is intensified according to the determined intensity value.

2. The method of claim 1, further comprising the step of: determining a distance from the image at which pixels are to be given a minimum intensity value; and wherein the corresponding edge of the mask is spaced apart from the image by that distance.

3. The method of claim 2 wherein the step of determining the distance by which the edge of the mask is spaced apart from the image includes the step of:

determining a smallest distance from the image at which a placement of a filter produces an intersection volume of zero with the image.

4. The method of claim 3 wherein the filter is circular and symmetrical in shape and the smallest distance is equal to a radius of the filter.

5. The method of claim 1 wherein the image includes a line, and the edge of the mask is placed parallel to the line.

6. The method of claim 1 wherein the image includes a line, and the edge of the mask is placed perpendicular to the line.

7. The method of claim 1, further comprising the step of: developing an intensity function that characterizes a relationship between intensity values and distances of pixels from the edge of the mask.

8. The method of claim 7, further comprising the step of:

implementing the intensity function as a table that maps distances of pixels from the edge of the mask to intensity values, the table including entries, each entry storing one of the intensity values, the table using distances of pixels form the edge of the mask as a index to the stored intensity values.

9. The method of claim 7, further comprising the step of:

implementing a piece-wise linear approximation of the intensity function using hardware.

10. The method of claim 1, further comprising the steps of:

representing the edge by an edge function; and evaluating the edge function for the pixel to compute the distance value of the pixel from the edge.

11. The method of claim 1, further comprising the steps of:

representing the edge of the mask by an edge function;

multiplying the edge function by a scale factor to produce a distance function that represents the edge of the mask; and evaluating the distance function for the pixel to determine the distance of the pixel from the edge of the mask in units of pixels.

12. The method of claim 11, wherein the image includes a line, and the scale factor is the reciprocal of the length of the line.

13. The method of claim 11, further comprising the steps of:

normalizing the distance determined by the distance function so that a normalized distance of 1 represents a Euclidean distance over which intensity values given to pixels range from 0 to a maximum value.

14. The method of claim 13, wherein the normalized distance is based upon a width of the line and a width of a filter.

15. A computerized method for rendering an image defined by pixels, comprising the steps of:

placing a mask near a line of the image, the mask including a plurality of edges defined by distance functions, the edges together defining boundaries that surround the image;

selecting a pixel within the mask;

determining for each edge of the mask, a distance value representing a distance of the selected pixel from a corresponding edge of the mask; and determining an intensity value for the selected pixel based upon the determined distance values, the determined intensity value improving the perceived quality of the image by reducing aliasing artifacts when the selected pixel is intensified according to that intensity value.

16. The method of claim 15, further comprising the steps of:

determining an overall distance value from the determined distance values; and using the overall distance value to determine the intensity value for the selected pixel.

17. The method of claim 16 wherein the step of computing the overall distance value includes equating the overall distance value to a minimum of the distance values.

18. The method of claim 16 wherein the step of computing the overall distance value includes equating the overall distance value to a product of the distance values.

19. The method of claim 16, wherein the image is a line, two of the edges of the mask are perpendicular to the line and two of the edges of the mask are parallel to the line, and the step of computing the overall distance value includes calculating the overall distance value to a product of a minimum of the distance values for the perpendicular edges of the mask multiplied by a minimum of the distance values for the parallel edges of the mask.

20. The method of claim 15, further comprising the steps of:
determining an intensity value for each distance value; and combining the intensity values for the distance values to produce the intensity value for the pixel.

21. The method of claim 20 wherein the intensity value for the pixel is a product of the intensity values determined for the distance values.

22. The method of claim 15, wherein the image is a line, two of the edges of the mask are perpendicular to the line and two of the edges of the mask are parallel to the line, and further comprising the steps of:
determining a minimum of the distance values for the perpendicular edges of the mask;
determining a minimum of the distance values for the parallel edges of the line;
determining an intensity value for each minimum distance value; and
multiplying the intensity values determined for the minimum distance values to compute the intensity value for the pixel.

23. The method of claim 15 wherein the distance values are used to index a multidimensional table to produce the intensity value for the pixel.

24. The method of claim 15 wherein the image is a line and two of the edges of the mask are perpendicular to the line and two of the edges of the mask are parallel to the line, and further comprising the steps of:
determining a minimum of the distance values of the parallel edges;
determining a minimum of the distance values of the perpendicular edges; and
using the determined minimum distance values to index a two-dimensional table to determine the intensity value for the pixel.

25. The method of claim 15 wherein the image is a line with an end and a beginning, and the step of selecting selects the pixel from near the end of the line, and further comprising the step of:
selecting subsequent pixels for processing such that the line is traversed in a direction that generally proceeds from the end of the line to the beginning.

26. A computer system for rendering an image defined by pixels, comprising:
means for placing a mask a distance outside of the line of the image, the mask including a plurality of edges defined by distance evaluators, the edges together defining boundaries that surround the image;
means for selecting a pixel within the mask;
means for determining, for each edge of the mask, a distance value representing a distance of the pixel from that corresponding edge of the mask; and
means for determining an intensity value for the pixel based upon the determined distance values, the determined intensity value improving the perceived quality of the image by reducing aliasing artifacts when the pixel is intensified according to the determined intensity value.

27. The system of claim 26, further comprising:
means for determining an overall distance value from the determined distance values; and
means for determining the intensity value from the overall distance value.

28. The system of claim 26, further comprising:
means for determining an intensity value for each distance value; and
means for combining the intensity values for each distance value to produce the intensity value for the pixel.

29. The system of claim 26, wherein the image is a line, two of the edges of the mask are perpendicular to the line and two of the edges of the mask are parallel to the line, and further comprising:
means for determining a minimum of the distance values for the perpendicular edges of the mask;
means for determining a minimum of the distance values for the parallel edges of the mask;
means for determining an intensity value for each minimum distance value; and
means for multiplying the intensity values determined for the minimum distance values to computer the intensity value for the pixel.

30. The system of claim 26, further comprising:
a multidimensional table for storing intensity values; and
wherein the distance values are used to index the multidimensional table to produce the intensity value for the pixel.

31. The system of claim 26 wherein the image is a line and two of the edges of the mask are perpendicular to the line and two of the edges of the mask are parallel to the line, and further comprising:
a two-dimensional table for storing intensity values for pixels;
means for determining a minimum of the distance values of the parallel edge of the mask; and
means for determining a minimum of the distance values of the perpendicular edges of the mask, the determined minimum distance values being used to index the two-dimensional table to determine the intensity value for the pixel.

32. A computerized method for rendering an image defined by pixels, comprising:
placing a mask a predetermined distance outside of a line of the image, the mask including a plurality of edges defining a distance evaluator which bound the line;
initializing the distance evaluators such that each distance evaluator computes the minimum distance between a corresponding edge of the mask and a pixel about the line;
selecting a pixel within the mask;
determining the value of the distance evaluators at the selected pixel; and
determining an intensity value for the selected pixel based upon the determined distances between the edge of the mask and the pixel, the determined intensity value improving the perceived quality of the image by reducing aliasing artifacts when the selected pixel is intensified according to the corresponding intensity value.

33. The method of claim 32, further including the step of combining one or more of the determined distances before the step of determining the intensity value.

34. The method of claim 33, wherein combining the determined distances results in a determination of an overall distance value, and the method includes the step of using the overall distance value to determine the intensity value for the selected pixel.

35. The method of claim 34 wherein computing the overall distance value includes equating the overall distance value to a minimum of the determined distance values.

36. The method of claim 34 wherein computing the overall distance value includes equating the overall distance value to a product of the determined distance values.

37. The method of claim 33, wherein the image is a line, two of the edges or the mask that bound the line are perpendicular to the line and the remaining two edges are parallel to the line, and the step of computing the overall distance value includes calculating the overall distance value to a product of a minimum of the determined distance values for the perpendicular edges of the mask multiplied by a minimum of the determined distance values for the parallel edges of the mask.

38. The method of claim 33, further comprising determining an intensity value for each distance value; and combining the intensity values for the distance values to produce the intensity value for the pixel.

39. The method of claim 33, wherein the distance values are used to index a multi-dimensional table to produce the intensity value for each selected pixel.

40. The method of claim 33, wherein the image is a line, two of the edges of the mask are perpendicular to the line and the remaining edges of the mask are parallel to the line, and further comprising:

determining a minimum of the distance values for the perpendicular edges of the mask;

determining a minimum of the distance values for the parallel edges of the mask;

determining an intensity value for each minimum distance value; and multiplying the determined intensity values to compute the intensity value for the selected pixel.

* * * * *

UNITED STATES PATENT AND TRADEMARK OFFICE
CERTIFICATE OF CORRECTION

PATENT NO.    : 6,329,977 B1
DATED         : December 11, 2001
INVENTOR(S)   : McNamara et al.

It is certified that error appears in the above-identified patent and that said Letters Patent is hereby corrected as shown below:

Column 19,
Line 8, reads, "two or the edges of the mask that bound the line are" should read -- two of the edges of the mask that bound the line are --

Signed and Sealed this

Seventh Day of May, 2002

*Attest:*

*Attesting Officer*

JAMES E. ROGAN
*Director of the United States Patent and Trademark Office*